Feb. 11, 1941. W. J. RINGLE 2,231,350
ROLLER BEARING
Filed June 17, 1940
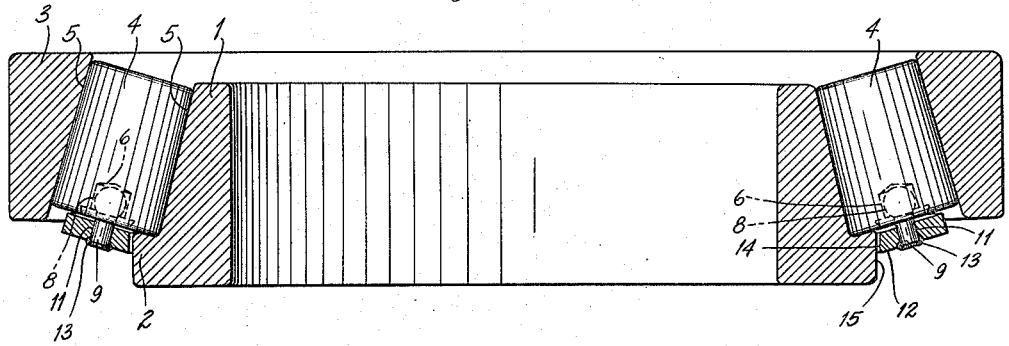
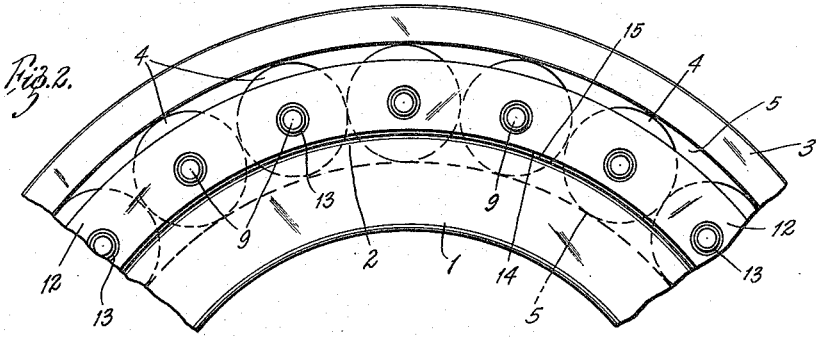
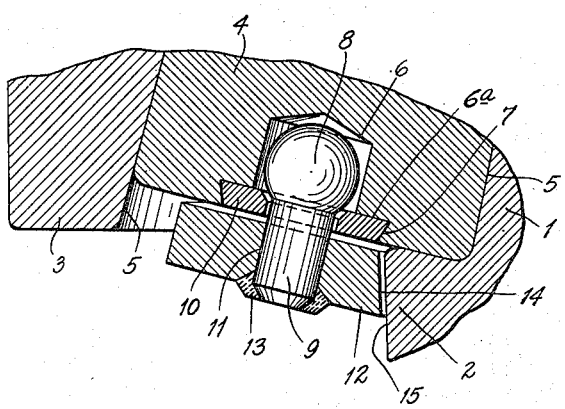
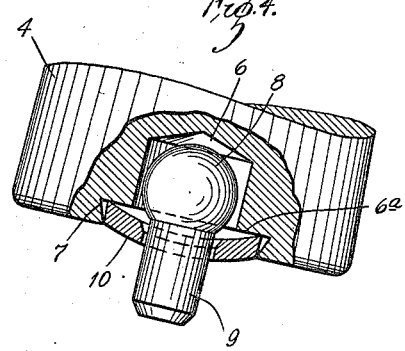
INVENTOR:
William J. Ringle,
by Carr Han Gravely,
HIS ATTORNEYS.

Patented Feb. 11, 1941

2,231,350

UNITED STATES PATENT OFFICE 2,231,350

ROLLER BEARING

William J. Ringle, Canton, Ohio, assignor to The Timken Roller Bearing Company, Canton, Ohio, a corporation of Ohio Application June 17, 1940, Serial No. 340,933

5 Claims. (Cl. 308—218)

My invention relates to roller bearings, particularly tapered roller bearings and has for its principal object a bearing of this type, wherein the individual rollers are of strong construction, wherein the rollers are assembled in a full series, that is, with individual rollers very closely spaced and wherein the cage construction is greatly simplified.

The invention consists principally in a roller bearing wherein the individual rollers have axial recesses in one end, in which recesses are disposed the enlarged heads of pins whose stems extend through openings in closure members for said recesses and are secured to a cage ring. The invention further consists in the roller bearing, in the roller and cage assembly and in the parts and combinations and arrangements of parts hereinafter described and claimed.

In the accompanying drawing—

Fig. 1 is a longitudinal half sectional view of a roller bearing embodying my invention, Fig. 2 is a partial end view, Fig. 3 is an enlarged partial sectional view of the end portion of one roller and associated cage parts; and Fig. 4 is a view similar to Fig. 3 showing a cage pin retaining plug before assembly.

The drawing illustrates a tapered roller bearing comprising a cone 1 or inner bearing member having a thrust rib 2 at its large end, a cup 3 or outer bearing member and conical bearing rollers 4 therebetween, the cup 3 and cone 1 having raceways 5 for said rollers 4. The cone is illustrated as being without the low retaining rib commonly used on the small ends of cones, but obviously such a rib may be added, if desired.

Each roller 4 has an axial recess 6 in its large end and a shallow counterbore 6a with an undercut side 7. Disposed in each roller recess 6 is the enlarged rounded head 8 of a pin 9 whose stem or body projects axially beyond the roller 4. Fitting loosely over the stem of each pin 9 is an annular disk 10 of the so-called welch plug type. As is well known, such a disk is initially dished outwardly and by axial pressure is brought into flat position, with the disk 10 firmly seated in the counterbore 6a and held by the undercut 7.

Each pin 9 extends through an opening 11 in a cage ring 12 in which it is suitably secured, as by welding 13. Preferably the inner periphery 14 of said cage ring 12 is cylindrical and rides rather closely on the cylindrical periphery 15 of the thrust rib 2. In this way, the cage is guided by the thrust rib and has no misalining effect on the rollers.

The above described construction has numerous advantages. The rollers are closely spaced but, at the same time, this is accomplished with the use of rollers that are solid, except for the small recesses at the larger end. The cage construction is greatly simplified, the cage is so located as not to have any misalining effect on the rollers and the cage and rollers form a self-contained unit.

What I claim is:

1. A cage and roller assembly comprising an annular series of rollers each having an axial recess in one end, a cage ring, a plurality of pins secured to said cage ring and each having an enlarged head extending into a roller recess and means for closing said recesses to prevent withdrawal of said pins.

2. A cage and roller assembly comprising an annular series of rollers each having an axial recess in one end and a counterbore at the outermost end of said recess, a cage ring, a plurality of pins secured to said cage ring and each having an enlarged head extending into a roller recess and a plurality of annular members each fitting over one of said pins and mounted in one of said counterbores.

3. A roller bearing construction comprising a bearing cone having a thrust rib at its larger end, tapered rollers thereon, each having an axial recess in its large end, a cage ring, a plurality of pins secured to said cage ring and each having an enlarged rounded head disposed in one of said roller recesses and an annular member disposed loosely over the body of each pin and closing the bore of the roller into which said pin extends.

4. A roller bearing construction comprising a bearing cone having a thrust rib at its larger end, tapered rollers thereon, each having an axial recess in its large end and a shallow counterbore at the outer end of said recess, a cage ring, a plurality of pins secured to said cage ring and each having an enlarged rounded head disposed in one of said roller recesses and an annular member disposed loosely over the body of each pin and fixed in the counterbore of the roller into which said pin extends.

5. A roller bearing construction comprising a bearing cone having a thrust rib at its larger end, tapered rollers thereon, each having an axial recess in its large end and a shallow undercut counterbore at the outer end of said recess, a cage ring, a plurality of pins secured to said cage ring and each having an enlarged rounded head disposed in one of said roller recesses and an annular welch plug disposed loosely over the body of each pin and seated in the counterbore of the roller into which said pin extends.

WILLIAM J. RINGLE.